June 29, 1948.

L. J. SIVIAN 2,444,069

SYSTEM FOR RECEIVING SOUNDS IN THE
PRESENCE OF DISTURBING NOISES

Filed March 2, 1945

INVENTOR
*L. J. SIVIAN*

BY

*Walter E. Kiesel*

ATTORNEY

Patented June 29, 1948

2,444,069

UNITED STATES PATENT OFFICE 2,444,069

SYSTEM FOR RECEIVING SOUNDS IN THE PRESENCE OF DISTURBING NOISES

Leon J. Sivian, Summit, N. J., assignor to Bell Telephone Laboratories, Incorporated, New York, N. Y., a corporation of New York Application March 2, 1945, Serial No. 580,684

4 Claims. (Cl. 177—386)

This invention relates to signal translating systems and more particularly to submarine signaling systems especially suitable for the reception of low frequency signals.

In some situations it is desirable to view sonically a wide area, for example a 360-degree field about a reference point, in the presence of a nearby source of sonic signals. For example, in some signaling systems on ships, it is desirable that submarine signals emanating from a distant source at any direction with respect to the ship be detectable at the ship. The propeller of the ship, however, constitutes a disturbing noise source which may interfere seriously with the detection of the desired signals.

One object of this invention is to enable the reception at a station of signals emanating from any point within a wide angular field with reference to the station, in the presence of a disturbing signal source in the vicinity of the station. More specifically, one object of this invention is to substantially eliminate the effects of propeller noise upon the reception at a ship of submarine signals emanating from a distant source.

In accordance with one feature of this invention, a signal translating system comprises a pair of signal responsive devices constructed and associated so that the resultant of the combined outputs of the two devices for signals emanating from a source in the vicinity thereof is substantially zero, whereas for signals emanating from a distant source the resultant is substantially equal to the output of one of the devices.

In a specific and illustrative embodiment of this invention, a submarine signaling system suitable for use on a ship comprises a pressure-type hydrophone and a pressure gradient-type hydrophone and means for adjusting the relative phase and amplitude of the outputs of the two hydrophones so that for noise originating at a propeller of the ship the resultant of the combined outputs of the two hydrophones is substantially zero whereas for signals emanating from a source distant from the ship, the resultant of these outputs is substantially that of the pressure-type hydrophone.

Figure 1:
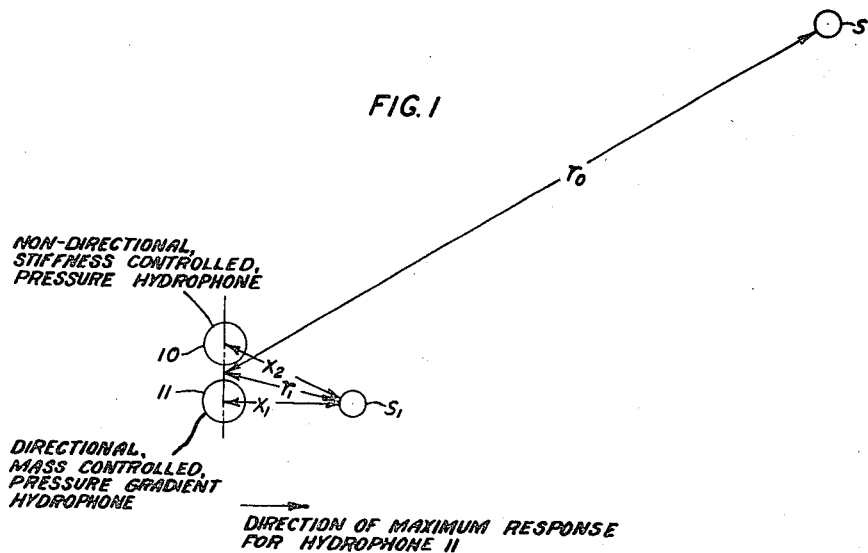
Figure 2:
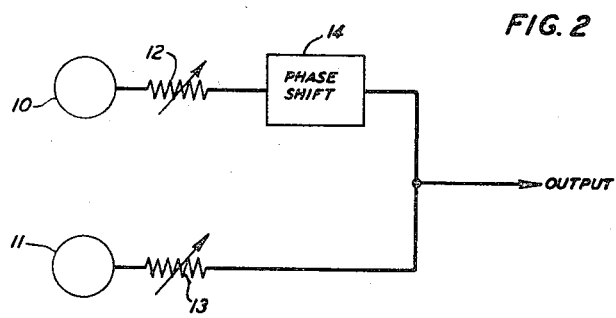

The invention and the above-noted and other features thereof will be understood more clearly and fully from the following detailed description with reference to the accompanying drawing in which:

Fig. 1 is a diagram which will be referred to hereinafter in a discussion of certain principles involved in this invention; and Fig. 2 is a circuit schematic showing the electrical association of the signal translating devices in an illustrative embodiment of this invention.

The principles involved in submarine signal detecting or receiving systems constructed in accordance with this invention will be understood from the following consideration with reference to Fig. 1. In this figure, 10 designates a non-directional hydrophone of the pressure type and 11 designates a directional, velocity or pressure gradient-type hydrophone, the two hydrophones being mounted in proximity, for example in vertical alignment below the keel of a ship, and so that both are exposed to signals emanating from a source anywhere within a 360-degree field about a prescribed axis, for example the vertical axis of alignment of the two hydrophones. Such a source, which may be a submarine, is indicated in Fig. 1 at S, a distance $r_0$ from the hydrophones. A disturbing nearby source, for example a ship's propeller, is indicated at $S_1$, at a distance $r_1$ from the hydrophones, the distance $r_1$ being much smaller than the distance $r_0$ and, for reasons which will be appreciated from subsequent discussion, is small in comparison to the wavelength of the highest frequency it is desired to detect or receive.

The output of the hydrophone 10 in response to signal waves received thereby is independent of the angle of incidence of such waves thereon. That is, this hydrophone is non-directional or omnidirectional. This output is proportional to the pressure of the incident waves and the pressure, as is known, varies inversely as the distance between the hydrophone and the signal source.

The output of the hydrophone 11 is dependent upon the angle of incidence of the signal waves and is proportional to the pressure gradient of such waves. The pressure gradient, as is known, comprises two factors or components, one of which varies inversely as the distance noted and the other of which varies inversely as the square of this distance. These components may be in or out of phase depending upon the character of the wave front at the hydrophone. Specifically, for distances large in comparison to the wavelengths of the signals received, the wave fronts are essentially plane and the two components noted are substantially in phase; for distances small in comparison to the wavelength, the wave fronts are highly curved and the two components are out of phase to an extent dependent upon the distance.

The outputs of the two hydrophones may be expressed mathematically as:

$$E_{10} = B_{10} \frac{1}{r} \sin(kr - \omega t) \qquad (1)$$

and $$E_{11} = -B_{11}\left(\cos\varphi \sqrt{\left(\frac{1}{r}\right)^2 + k^2}\right)\left(\frac{1}{r}\sin[kr - \omega t - \theta]\right) \qquad (2)$$

where $E_{10}$ = output voltage of the hydrophone 10
$E_{11}$ = output voltage of the hydrophone 11
$B_{10}$ = a constant determined by the sensitivity of the hydrophone 10
$B_{11}$ = a constant determined by the sensitivity of the hydrophone 11
$r$ = distance from the sound source to the hydrophones
$\omega = 2\pi$ times the frequency of the signals
$t$ = time
$\varphi$ = the angle between the direction of the incident signals and the direction for which the hydrophone 11 has the maximum response $k$ = a constant = —

$c$ = velocity of the signals, e. g. velocity of sound in water
$\theta = \tan^{-1} kr$ = the phase angle of the resultant of the two components of the pressure gradient It will be noted from Equations 1 and 2 that a resultant output ($E_{10}+E_{11}$) of substantially zero from the two microphones can be obtained for signals emanating from a source at any fixed distance from the hydrophones by correlation of the sensitivities of the two hydrophones and the phases of the output voltages.

Advantageously, the hydrophone 11 is so mounted relative to the disturbing source $S_1$ that the angle $\varphi$ is zero. Then, the output of the two hydrophones in combination for signals emanating from the source $S_1$ can be made zero by adjusting $B_{10}$ or $B_{11}$ or both so that $$B_{10} = B_{11}\sqrt{\left(\frac{1}{r_1}\right)^2 + k^2} \qquad (3)$$

and retarding the phase of $E_{10}$ by $$\theta_1 = \tan^{-1}(kr_1) \qquad (4)$$

The adjustment of $B_{10}$ and $B_{11}$ may be effected, as shown in Fig. 2, by series resistors 12 and 13 and the adjustment of the phase of $E_{10}$ may be effected by a suitable phase shift 14, for example a resistance-condenser network.

When the relative sensitivities of the hydrophones and the relative phase of the output voltage of the hydrophone 10 are adjusted as noted above to produce a resultant output of zero for signals emanating from the source $S_1$, the output of the two hydrophones for signals emanating from the source S at the distance $r_0$ is substantially as given by the equations $$E_{10} = B_{10}\frac{1}{r_0}\sin(kr_0 - \omega t - \theta_1) \qquad (5)$$

and $$E_{11} = -B_{10}\cos\varphi \frac{\sqrt{\left(\frac{1}{r_0}\right)^2 + k^2}}{\sqrt{\left(\frac{1}{r_1}\right)^2 + k^2}} \sin(kr - \omega t - \theta) \qquad (6)$$

As noted heretofore, the distance $r_1$ is very small in comparison to the wavelength of the signals received. For a source S at a substantial distance from the hydrophones, $r_0$ is large in comparison to the wavelength. The term $k$ also is very small for audio frequencies. As will be apparent, the ratio $$\frac{\sqrt{\left(\frac{1}{r_0}\right)^2 + k^2}}{\sqrt{\left(\frac{1}{r_1}\right)^2 + k^2}}$$

then, is very small and, therefore, $E_{11}$ as expressed by Equation 6 also is very small. Hence, the resultant output $E_{10}+E_{11}$, of the two hydrophones for signals emanating from the source S is substantially that of the hydrophone 10 alone. Thus the hydrophones effectively discriminate against the disturbing source $S_1$, i. e., produce substantially zero output for signals emanating from this source, yet produce a substantial output, essentially that of the hydrophone 10, for signals emanating from a distant source S.

Theoretically, perfect discrimination against the disturbing source $S_1$, i. e., zero resultant output for signals from the source, obtains only for a single frequency inasmuch as both the sensitivity terms $B_{10}$ and $B_{11}$ and the phase angle $\theta$ involve the frequency. Practically, however, satisfactory discrimination over a band of frequencies is achieved by proper positioning of the hydrophones relative to the disturbing source $S_1$. For example, discrimination of at least 20 decibels over a given frequency range can be realized by mounting the hydrophones so that $r_1$ is equal to or less than 1/20 of the wavelength of the highest frequency in the range given. For such value of $r_1$, the phase adjustment required may be expressed as $$\theta_1 = \frac{r_1 \omega}{c} \qquad (7)$$

That is, the phase angle is proportional to frequency. Hence, a phase adjustment over the desired range of frequencies obtains when the microphone 11 is positioned at a distance $x_1$ from the disturbing source less than the distance $x_2$ between this source and the hydrophone 10, $x$ being small in comparison to the wavelength, as indicated above.

Another factor to be considered in the case of operation over a band of frequencies is the amplitude and phase distortion which may be introduced by the hydrophones and the associated circuit. In some hydrophones, the relation in amplitude and phase, of the outputs of hydrophones 10 and 11 to the pressure and pressure gradient respectively of the incident sound waves may vary differently with frequency. Advantageously, in order to simplify the adjustments requisite to discriminate against the disturbing source $S_1$, the hydrophones are selected so that each exhibits a single form of vibrational control throughout the desired frequency range. For example, the pressure hydrophone 10 may be stiffness-controlled over the desired frequency range and the pressure gradient hydrophone may be mass-controlled over this range, so that but a single adjustment of relative amplitude and phase provides substantial discrimination against the source $S_1$ over the desired frequency range.

What is claimed is:

1. A signal translating system for discriminating between signals emanating from a pair of widely spaced sources, said system comprising a pressure-type signal transducer, a pressure gradient-type signal transducer, said transducers being positioned in proximity to one of said sources and in fixed relation thereto, means for combining the outputs of said transducers to produce a resultant determined by the difference of said outputs, and means for adjusting the relative phase and amplitude of said outputs so that said resultant for signals emanating from said one source is substantially zero, said pressure-type transducer being spaced from said one source a distance greater than that between said one source and said pressure gradient-type transducer and both said transducers being spaced from said one source a distance comparable to a small fraction of the wavelength of a preassigned frequency to be translated by said system.

2. A sonic signal translating system for detecting signals within a preassigned frequency range emanating from a distant source in the presence of signals of similar character emanating from a nearby source, said system comprising a non-directional pressure-type signal transducer, a pressure gradient-type signal transducer, said transducers being spaced from said nearby source a distance small in comparison to the wavelength of the highest frequency in said preassigned range, means for combining the outputs of said transducers to produce a resultant determined by the difference of said outputs, and means for adjusting the relative amplitudes of said outputs and shifting the phase of the output of said pressure-type transducer so that for signals emanating from said nearby source said resultant is substantially zero.

3. A signal translating system in accordance with claim 2 wherein said pressure-type transducer is stiffness-controlled throughout said range and said pressure gradient-type transducer is mass-controlled throughout said range.

4. A submarine signal translating system for detecting signals within a preassigned frequency range emanating from one source, in the presence of a second source remote from said one source, said system comprising a non-directional pressure, stiffness-controlled hydrophone, a pressure gradient, mass-controlled hydrophone, said hydrophones being spaced from said second source a distance small in comparison to the wavelength of the highest frequency within said range and said pressure hydrophone being spaced from said second source a distance greater than that between said pressure gradient hydrophone and said second source, means for combining the outputs of said hydrophones to produce a resultant determined by the difference of said outputs, and means for adjusting the relative amplitude and phase of said outputs so that for signals emanating from said second source said resultant is substantially zero.

LEON J. SIVIAN.

REFERENCES CITED

The following references are of record in the file of this patent:

UNITED STATES PATENTS

| Number | Name | Date |
|---|---|---|
| 1,312,809 | Scribner et al. | Aug. 12, 1919 |
| 2,368,953 | Walsh | Feb. 6, 1945 |
| 2,376,730 | Steinhoff | May 22, 1945 |

FOREIGN PATENTS

| Number | Country | Date |
|---|---|---|
| 297,977 | Germany | Jan. 19, 1920 |
| 527,678 | Germany | Sept. 23, 1931 |
| 567,999 | Germany | Jan. 12, 1933 |